MORRIS L. ROTHSTEIN
HOWARD B. ROTHSTEIN
*INVENTORS.*

BY

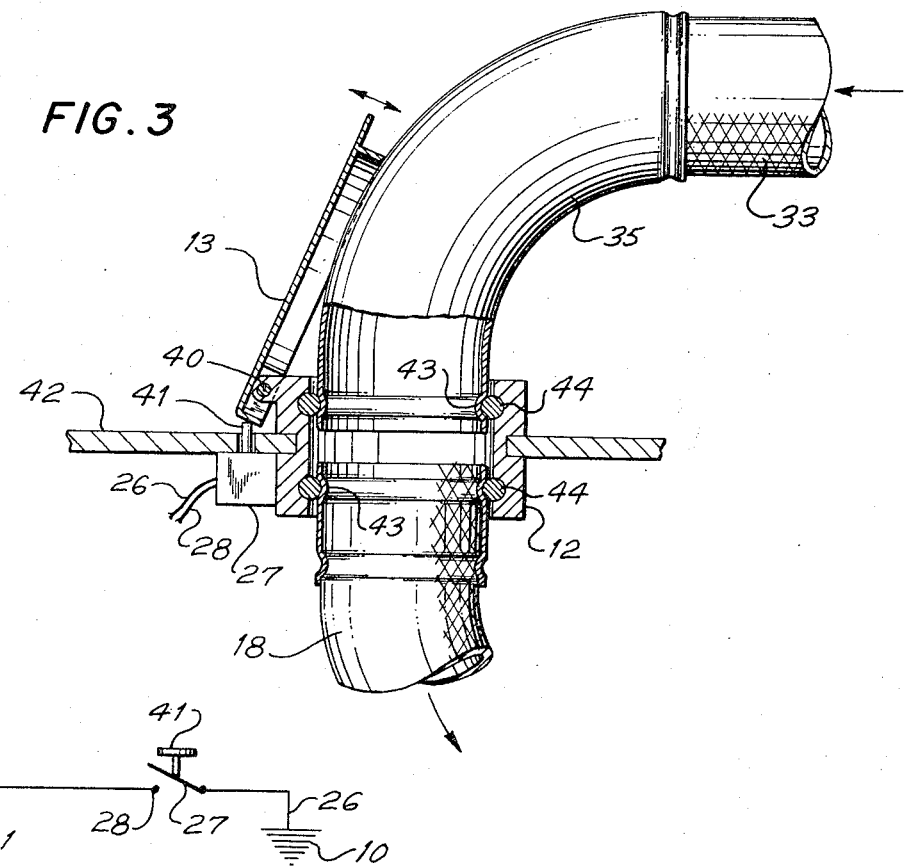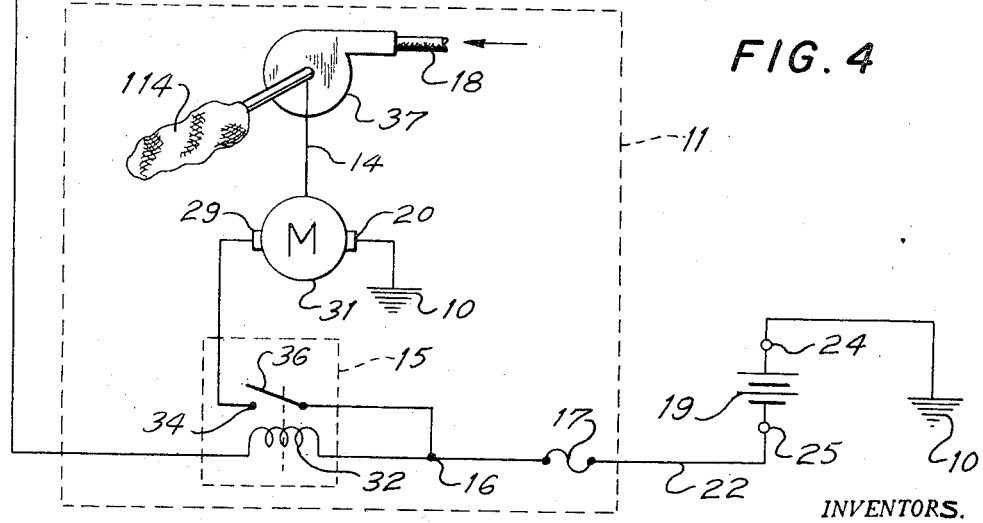

United States Patent Office 3,449,787
Patented June 17, 1969

3,449,787
CENTRAL VACUUM CLEANING SYSTEM FOR VEHICLES
Morris L. Rothstein, 1181 E. 85th St., Brooklyn, N.Y. 11228, and Howard B. Rothstein, 16 Karl Drive, Old Bridge, N.J. 08851
Filed Jan. 16, 1967, Ser. No. 609,481
Int. Cl. B60s *1/64;* A47l *5/38*
U.S. Cl. 15—313                    8 Claims

ABSTRACT OF THE DISCLOSURE

A central vacuum cleaning system for use in a vehicle which is entirely self-contained and portable, and powered by the battery of the vehicle. A convenience coupling is provided within the vehicle to receive a flexible vacuum hose for cleaning the interior of the vehicle while either stationary or in motion. The cleaning unit includes a solenoid, connected to the vehicle's battery and the cleaning unit, and electrically responsive to the insertion of the cleaning hose into the convenience outlet.

---

This invention relates to a novel and improved vacuum cleaning system for use on moving vehicles.

More specifically, this invention relates to a vacuum cleaning system which may be used on a vehicle while in motion to clean its interior with the same efficiency as conventional external cleaners.

Conventional techniques to vacuum the interior of vehicles require the use of exterior household vacuum cleaners and related attachments. These cleaners typically employ long and cumbersome extension cords to reach remote electrical sockets or receptacles in order to power the cleaners. These cleaning operations are most easily performed in garages, or near homes having convenient sources of electrical power. However, in many cases, especially in large cities, private garages or homes are not available and individuals must resort to either brush cleaning by hand or pay to have the vacuum cleaning done.

In the prior art, vacuum cleaners have been disclosed for use in automobiles comprised of a motor and suction fan arrangement secured directly beneath the floor boards of the vehicle. These cleaners include a vacuum outlet extending through the floor board to the interior of the vehicle to permit a suction hose to be secured thereon. The known vacuum cleaners also employ a pair of switch contacts disposed within the vacuum chamber so that insertion of the vacuum hose will urge the contacts to close so as to connect the car battery to the vacuum cleaner motor. An obvious disadvantage of these cleaners is that the effect of the high current employed in operating the vacuum cleaner motor together with the dirt to which the contacts are exposed substantially impair the reliability of operation of the cleaner.

In another known arrangement of a cleaning device for use in a moving vehicle, a long cylindrical housing is provided having a suction hose slidably stored therein and coupled at one end to a vacuum pump. The hose may be withdrawn from one end of the housing for use within the vehicle when desired. A switch on the dashboard of the vehicle energizes the electric vacuum pump.

Both of the foregoing cleaners suffer from the disadvantage that they dispose of the dirt on to the road beneath the vehicle in violation of the rules of the road since they thus employ no dust bag or collecting means.

Another conventional vacuum cleaner for use in moving vehicles comprises a suction pump that is powered by means of a flexible cable from the crankshaft of the vehicle instead of the battery of the car. A clutch mechanism operated from the dashboard of the car engages and disengages the suction pump from the flexible cable to operate the vacuum cleaner. This arrangement has been found to be more cumbersome and less reliable than conventional battery operated vacuum cleaners.

Accordingly, the present invention provides a central vacuum cleaning system for use in moving vehicles which is powered from the battery of the vehicle in response to the insertion of a flexible hose into a vacuum coupling. The cleaner is housed in a convenient hidden compartment in the vehicle. The vacuum inlet of the cleaner is connected to a coupling, the opposite end of which is made accessible to the interior of the vehicle. The coupling includes a lid over its inlet which when opened, actuates a solenoid to connect the cleaner motor to the battery and thus turn on the cleaning system.

It is therefore a primary object according to the present invention to provide a cleaning apparatus for use in a moving vehicle having a cleaning capability within the vehicle comparable to that found in the home.

A further object of this invention is to provide a means for remotely actuating the cleaner in response to the coupling of a vacuum hose to the cleaner.

Another object according to the present invention is to provide a central vacuum cleaning system which may be readily adopted for use in existing moving vehicles.

It is still a further object according to the present invention to provide a vacuum cleaning system for use in moving vehicles which is simple in design, easy to manufacture, that may be quickly installed in the vehicle, and reliable in operation.

Other objects and features of the present invention will become apparent from the following detailed description considered in connection with the accompanying drawings, which disclose the embodiments of the present invention. It should be understood, however, that the drawings are designed for purposes of illustration only and not as a definition of the limits of the invention as to which reference should be made to the appended claims.

In the drawings, wherein similar reference characters denote similar elements throughout the several views:

FIG. 3 is a view partly in cross-section of the vacuum hose coupling of the cleaning system according to the invention; and FIG. 4 is an electrical schematic diagram of the cleaning system according to the invention.

Figure 1:
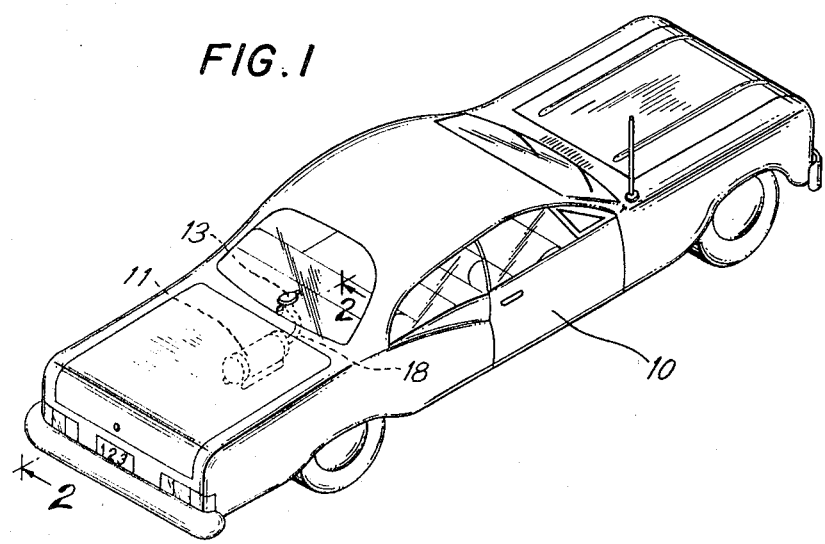
FIG. 1 is a view slightly in elevation illustrating the cleaning system according to the invention installed in a moving vehicle.
Figure 2:
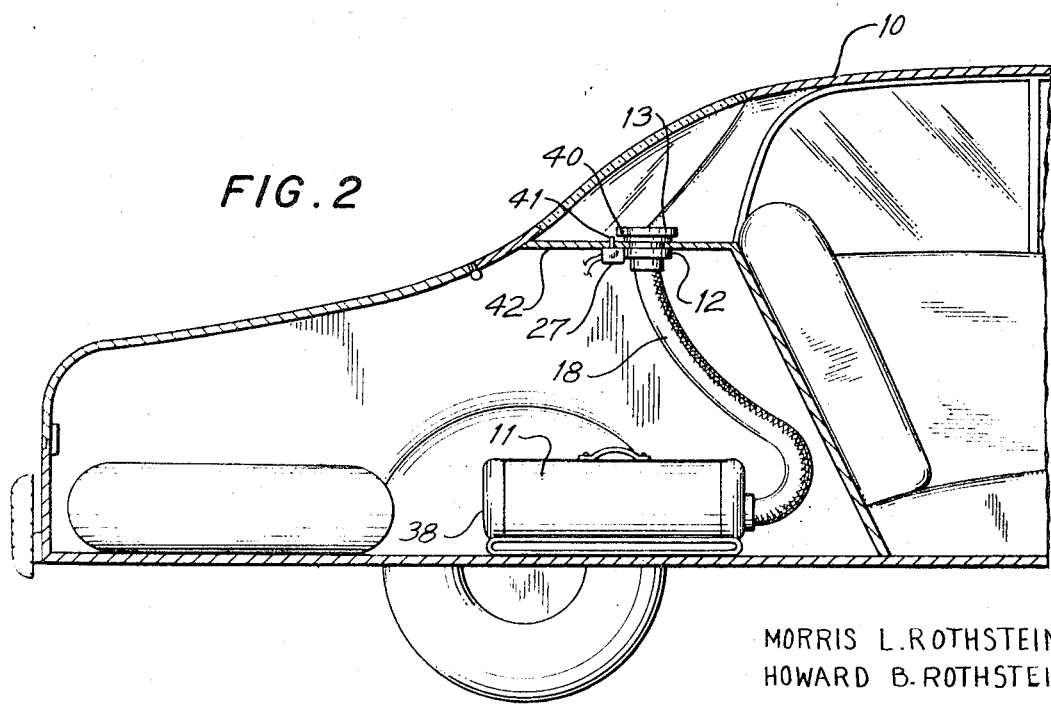
FIG. 2 is a view of section 2—2 of FIG. 1.

Referring to FIGS. 1 and 2 there is shown a view partly in perspective, of the central cleaning system according to the invention mounted in a moving vehicle such as an automobile. A vacuum cleaning unit 11 is shown conveniently stored, for the purposes of illustration, in the trunk compartment of vehicle 10. Cleaning unit 11 is comprised of a conventional vacuum cleaning unit as is well known in the art, having an electric motor mechanically coupled to a vacuum pump. The motor has been adapted to operate on the standard direct current voltage produced by the battery of a motor vehicle. To the input of the vacuum pump is coupled a flexible vacuum hose 18. The opposite end of hose 18 is connected to a sleeve coupling 12 mounted on rear window shelf 42. Coupling 12 includes a spring loaded cover or lid 13, normally closed over its inlet. In mechanical contact with a portion of lid 13 is the plunger 41 of an electrical switch 27. Switch 27 includes a pair of contacts which remain normally closed for the position of the lid as shown.

Referring to FIGS. 3 and 4, coupling 12 is disclosed receiving a corresponding rigid pipe 35 connected to one end of a flexible vacuum hose 33. Vacuum pipe 35 is preferably designed to have a diameter slightly smaller than the inside diameter of coupling 12 so as to form a snug and substantially airtight fitting thereto. A detent 43 formed at the end of pipe 35 contacts O-ring 44 within the internal walls of coupling 12 to provide a positive seat of pipe 35 therein in a well-known conventional manner.

Flexible vacuum hose 33 is preferably designed to be sufficiently long when inserted into coupling 12 to reach any portion of the interior of the vehicle. At the opposite end of flexible tube 33 (not shown) may be coupled any one of a number of accessory fittings as are customarily provided with conventional vacuum cleaners.

Within motor vehicle 10 is located a battery 19 having one of its terminals 24 grounded to the chassis of vehicle 10. The other terminal 25 of battery 19 is connected to a conductor line 22 which is coupled at its opposite end to fuse 17. Fuse 17 may be located within any accessible portion of unit 11 convenient for maintenance. The opposite end of fuse 17 is connected to terminal 16 of a solenoid 15. Solenoid 15 includes a relay type actuating coil 32 having one terminal connected to terminal 16. Solenoid 15 also includes a stationary high current contact 34 and a corresponding movable contact 36 responsive to actuating coil 32. When coil 32 is not energized, contacts 34 and 36 remain normally open.

The purpose of solenoid 15 is to provide an electrical control for the large amount of current needed to operate electric motor 31 in unit 11 and to eliminate the necessity of employing a large, cumbersome, heavy-duty switch in contact with lid 13. It is also possible to employ a semi-conductor switch as a power control in place of solenoid 15. Solenoid 15 serves as an explosion proof shield surrounding high current contacts 34 and 36 and thus eliminates any hazard that may be caused by explosive mixtures of dust and gaseous vapors.

The opposite terminal of coil 32 is connected through conductor 21 to terminal 28 of switch 27. Switch 27 also includes a second terminal 26 which is grounded to the chassis of vehicle 10. The electrical contacts of switch 27 are responsive to a plunger 41 in mechanical contacts with the rear edge of lid 13. The electrical contacts within switch 27 are joined to terminals 26 and 28 and remain normally open when lid 13 is closed cover coupling 12 as shown in FIG. 2. It is conceivable that in place of switch 27, another switch may be suitably employed which is responsive to the insertion of hose 33 into coupling 12, regardless of the position of lid 13. In addition, a conventional switch may be connected across terminals 26 and 28 and positioned on the vehicle's dashboard to operate unit 11 independent of switch 27.

Cleaning unit 11 includes an electrical motor 31 of the "universal" type designed to operate from a low voltage battery source. Terminal 20 of motor 31 is grounded to the chassis of vehicle 10. The opposite terminal 29 is coupled to terminal 34 of solenoid 15.

The output shaft 14 of motor 31 is mechanically coupled to the motor of vacuum pump 37. The vacuum inlet of pump 37 is connected to coupling 12 through hose 18 in a manner similar to that described with respect to pipe 35. The output of pump 37 is connected to disposable dust bag 14 utilized for collecting the vacuumed particles.

The operation of the cleaning system proceeds as follows:

When lid 13 is raised to uncover the opening of coupling 12, it pivots on axis 40 and depresses plunger 41 of switch 27. The contacts within switch 27 become electrically engaged so as to ground conductor 21 and energize coil 32. This causes the solenoid contact 36 to close on contact 34 and connect electrical power to motor 31. Motor 31 then drives vacuum pump 37 in a conventional manner.

After pipe 35 of flexible hose 33 has been inserted into coupling 12, lid 13 is maintained in an opened position so as to permit the cleaning cycle to be maintained. The vacuum produced by vacuum pump 37 is transmitted through hoses 18 and 33 to the opening of a cleaning accessory connected on the opposite end of flexible hose 33. As the vehicle is cleaned, foreign particles collected by the accessory are pulled through hoses 18 and 33 into cleaning unit 11 and are collected in dust bag 114. The dust bag may be changed as required by removal of cover 38 (FIG. 2) of cleaning unit 11.

After the vacuum cleaning operation of vehicle 10 has been completed, pipe 35 is removed from coupling 12 so as to cause spring loaded lid 13 to close thereover and open the contacts of switch 27. This causes coil 32 of solenoid 15 to become de-energized and open the circuit connecting motor 31 to battery 19.

In a highly successful operational embodiment of the cleaning unit according to the invention a 12-volt universal electrical motor was coupled to the vacuum pump within unit 11 and powered by a 12-volt automotive battery. The motor was fused at 30 amps and drew a current between 20 and 25 amps during the cleaning operation. Under the above-described conditions the vacuum produced at the end of cleaning hose 33 was equal in magnitude to standard vacuum cleaners customarily employed for cleaning homes.

Since the vacuum cleaning unit according to the invention is portable and completely contained within the motor vehicle, it may be employed not only under conditions when the vehicle is stationary, but also by a passenger when the vehicle is in motion. This feature has been found particularly advantageous in areas where convenient sources of electrical power are unavailable for use by a motorist. Moreover, the central vacuum cleaning unit according to the invention provides the motorist with the instantaneous capability of cleaning his vehicle wherever and whenever he so desires without the need for stopping the vehicle and losing valuable time in transit. Moreover, when the vehicle is used under dusty or other severe driving conditions, it is possible for the motorist to maintain safe driving conditions within his vehicle by periodically cleaning it as he travels.

The motorist may also employ the vacuum cleaning unit according to the invention as a waste disposal unit for small items such as candy wrappers, cigarettes, matches and the like, by either directly tossing these articles into the opening of coupling 12 or permitting them to be picked up through flexible hose 33. Hose 33 may be stored by means of flexible clamps in any convenient by accessible position within the interior of the vehicle.

While only a single embodiment of the present invention has been shown and described, it is obvious that modifications may be made hereunto without departing from the nature and scope of the invention as defined in the appended claims.

What is claimed is:

1. A battery powered central vacuum cleaning system for use in a vehicle comprising: a vacuum pump, a coupling joined pneumatically to the vacuum inlet of a said pump for receiving a hose connection, an electrical motor mechanically coupled to said pump, switch means positioned remote from said motor and operable by a hose connection to said coupling, and electrical control means responsive to said switch means for connecting battery power to said motor.

2. The system as recited in claim 1 wherein said coupling includes a lid pivotably disposed over the inlet of said coupling.

3. The system as recited in claim 2 wherein said switch means is actuated by movement of said lid.

4. The system as recited in claim 3 wherein said electrical control means comprises a solenoid having an actuating circuit electrically responsive to said switch means.

5. The system as recited in claim 4 wherein said switch means comprises a plunger urged against a portion of said lid, and a pair of electrical contacts responsive to said plunger and normally open when said lid is fully closed across the inlet of said coupling.

6. The system as recited in claim 5 additionally comprising a vacuum hose having one end constructed for insertion into said coupling and having its opposite end constructed for collecting foreign particles.

7. The system as recited in claim 6 wherein said hose, inserted in said coupling, maintains said lid urged against said plunger to close said contacts and maintain said motor in an energized state.

8. The system as recited in claim 7 wherein said vacuum pump additionally comprises a dust bag coupled to its vacuum outlet for collecting said foreign particles.

References Cited

UNITED STATES PATENTS

| | | | |
|---|---|---|---|
| 1,729,364 | 9/1929 | Schweier et al. | |
| 1,810,607 | 6/1931 | Irons | 15—313 |
| 3,048,875 | 8/1962 | Bottinelli et al. | 15—314 XR |
| 3,230,567 | 1/1966 | Nickless | 15—313 |
| 3,250,382 | 5/1966 | Beil et al. | |

ROBERT W. MICHELL, *Primary Examiner.*